Aug. 24, 1965   J. W. EVANS ETAL   3,201,904
APPARATUS FOR FINISHING GLASS SURFACES
Filed Nov. 9, 1961   2 Sheets-Sheet 1
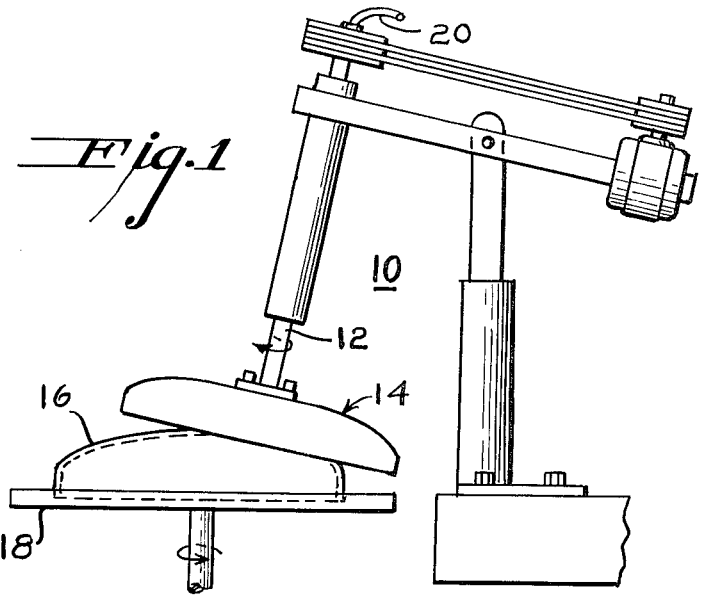
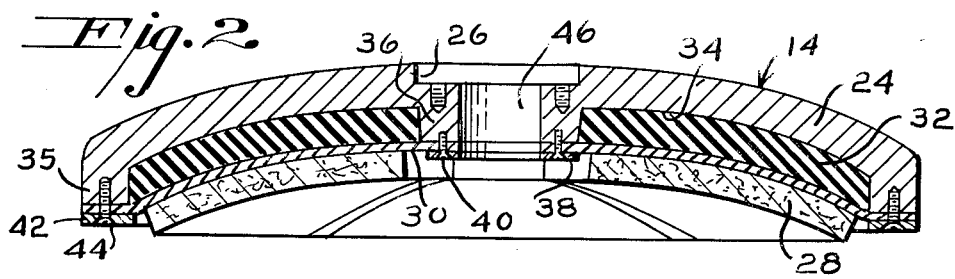
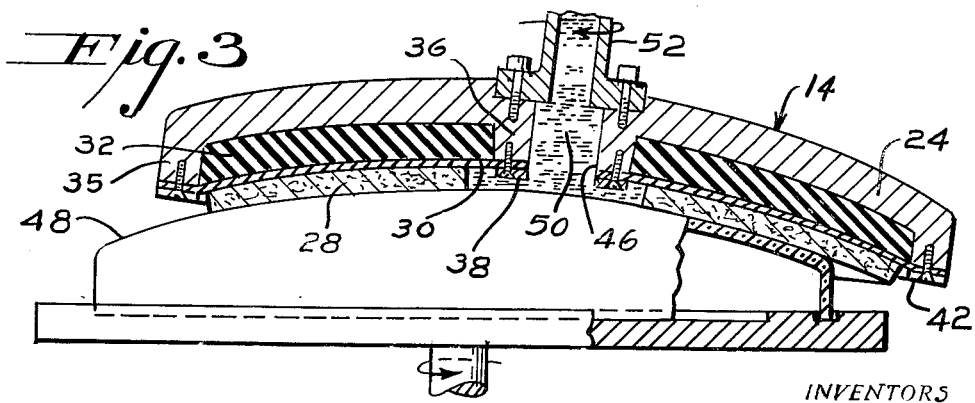
INVENTORS
JAMES W. EVANS
AND KARL E. SCHWARZ
BY Clarence R. Patty, Jr.
ATTORNEY Aug. 24, 1965     J. W. EVANS ETAL     3,201,904
APPARATUS FOR FINISHING GLASS SURFACES
Filed Nov. 9, 1961     2 Sheets-Sheet 2
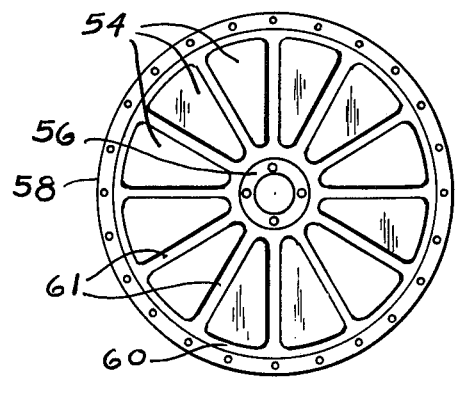
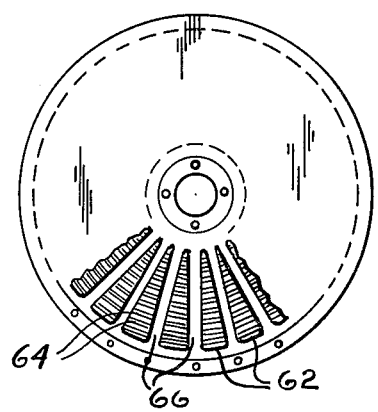
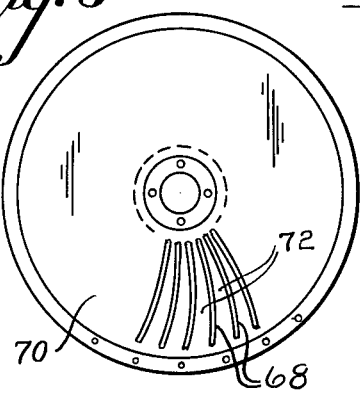
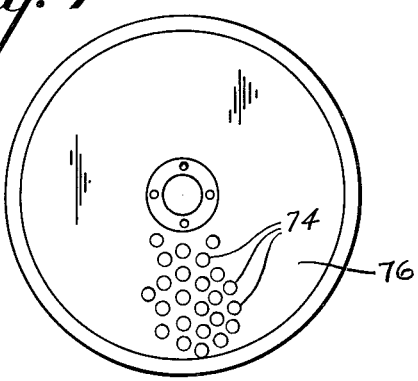
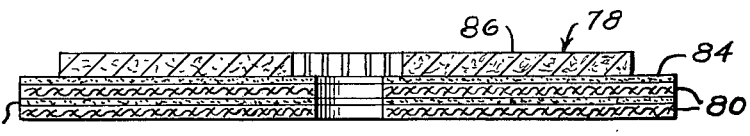
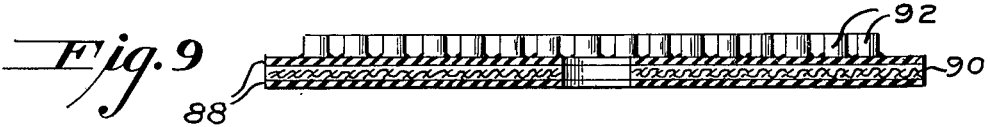
INVENTORS
JAMES W. EVANS
AND KARL E. SCHWARZ
BY Clarence R. Patty, Jr.
ATTORNEY

United States Patent Office 3,201,904
Patented Aug. 24, 1965

3,201,904
APPARATUS FOR FINISHING GLASS SURFACES
James W. Evans, Corning, and Karl E. Schwarz, Horseheads, N.Y., assignors to Corning Glass Works, Corning, N.Y., a corporation of New York
Filed Nov. 9, 1961, Ser. No. 151,736
11 Claims. (Cl. 51—358)

This invention relates to an apparatus for finishing glass surfaces and more particularly to an apparatus for grinding and/or polishing relatively large convex glass surfaces and glass surfaces having compound curves, although the invention is in no way limited to such use.

In the manufacture of cathode ray tubes, such as television picture tubes, the panels or viewing screen portions of such tubes are usually formed from charges of molten glass deposited in molds and pressed therein. The external face of the panel is usually of convex form having changing surface curvatures commonly referred to as compound curves. Such changing surface curvatures or compound curves are made up of varying radii, smoothly blended to effect a uniformly changing curvature, and are of decreasing dimension towards the periphery of said panel. Quite frequently the panels so formed are found to have exterior surface imperfections of a magnitude requiring grinding to produce the degree of quality required for ultimate use.

The various methods used heretofore for removing said imperfections permitted economic removal of only a small amount of glass, resulting in the need to select for such treatment only those panels which had minor imperfections while those with more serious imperfections had to be rejected. One such method consists of using an abrading belt which passes over the panel surface while the panel is mounted on a conveyor. The belt is brought to bear on the panel surface by means of rollers. Although such belts and rollers are flexible and can conform to the shape of the panel surface, they are normally flat. Consequently, when conforming to the panel surface they exert varying forces on it causing the removal of more glass from the high central area than from the lower edge area.

Another method for the removal of said imperfections consists of hand grinding with subsequent machine pumicing and polishing. Such pumicing and polishing is accomplished by rollers arranged in line permitting a series of successive operations. The panels, mounted on a conveyor, pass under the rollers which lower to contact the panel surface sequentially. Although such rollers have soft flexible surfaces, they are cylindrical in shape and can only make limited contact with the panel surface. Furthermore, when they conform to the panel contour, they also exert more force at the high central panel area than at the lower edge area. While this method is faster and more economical, it is likewise not suited to the uniform removal of the more serious imperfections.

It is an object of this invention to provide an apparatus whereby a comparatively large curved glass surface may be ground and polished substantially uniformly.

Another object is to provide an apparatus for removing severe imperfections from comparatively large curved glass surfaces.

Still another object is to provide an apparatus for faster and more economical grinding and polishing of comparatively large glass surfaces.

According to the present invention glass articles, such as television picture tube viewing panels, are caused to rotate about a central axis perpendicular to their surface with their convex surface exposed to a flexible disc rotating about a central axis perpendicular to its surface, the glass contacting surface of said flexible disc having a concave curvature of approximately the curvature of the convex glass surface and the flexible surface material of said flexible disc effecting a liquid seal of a resilient support therefor, said disc rotation being preferably in the opposite direction from the rotation of the panel and the said axes being offset one from another.

Additional objects, features and advantages of the present invention will become apparent to those skilled in the art from the following detailed description and the attached drawings on which, by way of example, only the preferred embodiments of this invention are illustrated.

FIG. 1 is a side elevation of a typical grinding and/or polishing machine embodying the invention and illustrating a television picture tube viewing panel being processed.

FIG. 2 is a sectional elevation of a polishing disc.

FIG. 3 is a sectional elevation of a polishing disc in contact with the convex surface of a television picture tube viewing panel.

FIGS. 4, 5, 6 and 7 are plan views of polishing, pumicing and grinding discs illustrating various lap arrangements.

FIGS. 8 and 9 are cross sectional views of flexible backings illustrating various lap attachments.

The process of this invention requires three basic steps for finishing curved glass articles. These steps are grinding, pumicing and polishing followed in each instance by washing. The grinding step removes a large amount of material from the surface wherein most imperfections are found. After grinding, the surface is comparatively rough and would require much polishing. To minimize polishing time, an intermediate pumicing step is used to prepare the glass surface for polishing. Pumicing may be defined as fine grinding or coarse polishing but is described separately herein solely for the purpose of distinguishing among the different disc materials, abrasives and slurries used for grinding and polishing. By incorporating the pumicing step the overall process can be divided into three operations of approximately equal time duration. After the pumicing step the glass article surface is polished.

According to the present invention a curved glass article is caused to rotate about a central axis perpendicular to its surface of curvature, with its convex surface exposed to a flexible disc rotating about a central axis perpendicular to its surface of curvature, said disc rotation preferably being in the opposite direction from the rotation of the glass article, and said axes being offset one from the other, with the axis of the disc perpendicularly intersecting the article curved surface between the center thereof and its periphery. As an article is brought under the disc, the disc is lowered to contact the article surface, conform with its curvature and exert a comparatively uniform force over the area of the article covered by said disc. Since the article and disc rotate, the entire surface of the article is progressively subjected to uniform treatment by the disc. It should be noted that rotation of the article and disc in the same direction accomplishes slower glass removal but is otherwise equivalent to rotation in opposite directions. Also in accordance with this invention a variety of disc surfaces, disc surface materials and abrasive slurries are used in conjunction with the various grinding, pumicing and polishing operations.

FIG. 1 illustrates a suitably adjustable grinding, pumicing or polishing apparatus generally indicated by the numeral 10, having a hollow drive shaft 12 to which a grinding, pumicing or polishing disc 14 is suitably attached.

A television picture tube viewing panel 16 is attached to rotating table 18 by suitable means, not shown. The grinding, pumicing or polishing medium is supplied to the surface being processed through the hollow drive shaft 12 by means of hose 20.

The grinding, pumicing and polishing discs are basically the same with the exception of the laps or lap segments which are the finishing elements which in conjunction with an abrasive slurry, come in contact with the article surface. Lap segments are finishing elements having a shape of a segment of a circle.

FIG. 2 illustrates a typical polishing disc 14, wherein housing 24, provided with recess 26, within which recess the said hollow drive shaft is attached to said disc. Polishing lap segments 28, are firmly bonded to a waterproof flexible impervious backing 30, which flexible backing covers and encloses resilient pad 32, said pad being positioned in cavity 34. Cavity 34 is surrounded by rim 35 at its outer edge and hub 36 at its inner edge. Said resilient pad 32 and cavity 34 are maintained watertight by effecting seals at the inner and outer edges of the disc by compressing the flexible backing 30 with ring 38 and screws 40 at hub 36 and ring 42 and screws 44 at rim 35. The means for attaching the hollow drive shaft to the disc and effecting a seal between the flexible backing and the disc are not critical and any suitable means may be used. The hub 36, is provided with bore 46, through which an abrasive slurry may be supplied to the surface of the article being finished.

In FIG. 3 the polishing disc illustrated in FIG. 2 is shown in contact with a convex surface, such as a television picture tube viewing panel 48, wherein the polishing lap segments 28, have conformed to the compound curve of said panel. A slurry 50, containing a polishing medium is being fed to the panel surface through the hollow drive shaft 52 and disc housing bore 46.

To be effective, a polishing, pumicing or grinding disc must be constructed with a curvature on its polishing, pumicing, or grinding surface which approximates the curvature of the article surface being so processed. Thereafter, when a force is applied to the disc, the lap segments will conform to the curvature of the article surface through flexing of the lap segments and/or the flexible impervious backing and resilient pad. It is important to note that the flexible impervious backing must be watertight and sealed at its edges to prevent the grinding, pumicing or polishing slurry from being absorbed by the resilient pad thereby causing said pad to lose resiliency and become firm.

A flexible impervious backing suitable for the present purpose must possess sufficient strength to withstand the force required to exert pressure on the article surface together with the torsional force required for grinding, pumicing and polishing. In addition, the flexible backing must withstand the repeated flexing produced by the changing article curvature which results from the rotation of the article and the disc.

Many types of flexible backing may be employed within the spirit and scope of this invention, so long as they are substantially waterproof, flexible and have the strength to transmit the aforesaid forces.

A large variety of materials and shapes may be selected for the various laps and lap segments. For example, grinding laps may be fabricated from sheet steel or steel plate suitably grooved to provide radial flexibility, cube or cylindrical steel or cast iron blocks bonded to thin sheet steel or bonded directly to the flexible backing, flexible link chain, silicon carbide or other refractory type material blocks, as well as other metals, plastics and the like having a variety of shapes. Industrial diamonds, with or without other abrasives, may be plated on or bonded to any of the above lap surfaces. Due to the general hardness of the grinding lap materials, peripheral flexibility is best obtained by having a minimum of 24 separations between the variously shaped laps, while 40 to 48 separations are preferred. These must be complete separations which expose the flexible backing, thereby allowing the substantially peripherally rigid grinding laps to remain rigid while peripheral flexibility is obtained through the flexing of the flexible backing and the resilient pad.

Pumicing lap segments may be fabricated from felt, natural rubber, rubber-like materials such as synthetic rubber, plastics and resins, and like materials. Such materials have substantially more flexibility than the grinding lap materials and the number of separations may suitably be reduced to a range of about 10 to 24 although a larger number may obviously be used.

Polishing lap segments are limited to relatively soft materials such as felt, plastic, rubber-like materials and the like. The number of separations may also suitably range from 10–24 although virtually any number of separations may be employed.

FIG. 4 illustrates a disc having a typical arrangement of twelve polishing or pumicing lap segments 54, together with sealing rings 56 and 58. Such lap segments may be formed separately and thereafter suitably bonded to the flexible backing 60, as in the case of felt polishing laps or may be formed as an integral part of the said flexible backing as in the case of rubber-like material pumicing laps, which may be molded as part of a rubber-like material covering applied to the flexible backing. Separations 61 are provided for suitable peripheral flexibility.

FIG. 5 is a disc similar to that shown in FIG. 4 illustrating an arrangement of 24 grinding lap segment 62, with grooves 64, cut therein to provide required radial flexibility. Separations 66 are provided for suitable peripheral flexibility.

FIG. 6 is also a disc similar to that shown in FIG. 4 illustrating an arrangement of numerous curved bars 68, adhered to flexible backing 70, maintained apart from one another by separations 72 and forming the lap surface of said disc. Such a lap arrangement is suitable for grinding, pumicing or polishing depending only on the material of the said bars.

FIG. 7 is also a disc similar to that shown in FIG. 4, illustrating a particularly suitable lap arrangement for grinding. Steel or cast iron blocks 74, are partly embedded in an uncured layer of rubber-like material forming the surface of flexible backing 76, said blocks are thereafter adhered to said backing by curing said layer of rubber-like material.

A wide range of slurries well known in the art may be used. Such slurries generally have a water medium combined with an abrasive. In the grinding step such abrasives as garnet, silicon carbide, aluminum oxide or the like may be used. Diamonds may also be suitably used; however, the slurry medium would then be composed of water and selected water soluble oils well known in the art. In the pumicing step, pumice abrasive is used. Polishing abrasives include iron oxide, cerium oxide, zirconium oxide, titanium oxide and the like. In addition, cerium oxide with various additives is commercially available and suitable for the present purposes.

It should be noted that the separations between the laps or lap segments, heretofore described, are necessary not only for peripheral flexibility but also to permit the abrasive slurry, supplied to the surface being processed, together with the glass particles abraded from the surface to be removed.

FIG. 8 illustrates a suitable flexible backing 78, composed of sheets of cotton canvas 80, sealed together with a layer of substantially water insoluble cement 82. A second layer of substantially water insoluble cement 84 is applied to one surface of the laminant so formed, to assure that the said backing will be waterproof and to enable the lap segments 86, to be bonded thereto. The type of water insoluble cement suitable for the present purposes is not critical and any water insoluble cement which is not brittle and can withstand repeated flexing may be used. One familiar with the art can readily select a suitable cement.

FIG. 9 illustrates another type of flexing backing. A layer of uncured rubber-like material 88, is applied to each surface of cloth 90, and steel or cast iron blocks 92 are arranged on one surface of the laminant so formed in a manner similar to that illustrated in FIG. 7. Said blocks are pressed into said uncured rubber-like material, partly embedding them, and the rubber-like material is thereafter cured. The material of cloth 90 is not critical and may be cotton canvas or the like.

A typical example of the present invention is shown by the following. Three disc housings were prepared each having a cavity to accommodate a resilient pad support for the flexible backing. The inner surface of each cavity was formed having a curvature of approximately the radius intermediate the maximum and minimum radii of a television picture tube viewing panel to be processed. Forming this curvature on the cavity surface enabled the use thereafter of a flat resilient pad. It should be noted however that the cavity surface could be made flat or any other shape if the outward surface of the resilient pad, after being fitted into the cavity, approximates the curvature of the article being processed.

The flexible backing for the grinding disc was prepared by applying uncured synthetic rubber to all surfaces of two properly sized cotton canvas cloths of 14 oz. material thereby forming a laminated structure. Three-quarter inch diameter steel blocks were then arranged on one surface of the laminated structure spaced on approximately 1" centers. The blocks were pressed into the layer of uncured synthetic rubber partly embedding them, and the rubber was subsequent cured.

The flexible backing for the pumicing disc was prepared in a similar manner to that of the grinding disc except that the laps were molded in segments and were composed of the same synthetic rubber which was applied to the canvas cloths. The resulting backing had 12 segments of about ½" thickness and separations of about ½" with the backing and lap segments forming a unitary structure. The synthetic rubber was of approximately 50–60 durameter hardness as measured on a Shore "A" scale.

The flexible backing for the polishing disc was formed of 2 properly sized cotton canvas cloths of 14 oz. material cemented together with a non-brittle substantially water insoluble cement. The cement not only bonded the cloths together, but permeated the material sufficiently to make it substantially waterproof. Twelve segments of ⅜" thick pressed belt were thereafter cemented with the same cement to one surface of the backing. Separations of about ¼" were maintained between the segments.

It should be noted that two cloths were used in forming each of the backings solely for the purpose of providing sufficient strength for the backing.

Foam rubber pads were fitted into each cavity of the three disc housings and were individually covered by one of the prepared flexible backings with the lap surface exposed. The foam rubber pads were thereafter sealed by compressing the inner and outer edges of said backing with rings clamped to the housing and the hub.

Each of the discs so formed were attached to apparatuses similar to that shown in FIG. 1. A commercial 23" size television picture tube viewing panel was mounted on the rotatable table of the apparatus having the grinding disc attached thereto, by suitable means. The apparatus was adjusted so that the central axis perpendicular to the surface of the disc substantially perpendicularly intersected the surface of said panel, when the disc was substantially in contact with the panel, at a point of between the center of the panel and its periphery.

The said panel was then rotated in a clockwise direction while the grinding disc was rotated in a counterclockwise direction. The disc was thereafter brought to bear on the panel surface for approximately 30 seconds, while a slurry of finely divided garnet and water was fed to the panel surface.

The said panel was then washed with water to remove the remaining garnet slurry, and the glass and grinding lap particles which were ground off, and was mounted on the pumicing apparatus in the same manner as for the grinding step. The adjustments and rotational directions were also the same as for the grinding step. The disc was brought to bear on the panel surface for approximately 30 seconds while a slurry of pumice, having a size of about 150 mesh, and water was fed to the panel surface.

The panel was washed again and mounted on the polishing apparatus which was adjusted in the same manner and operated in the same directions as for the grinding and pumicing steps. The polishing disc was then brought to bear on the panel surface for approximately 30 seconds while a slurry of finely divided iron oxide and water was fed to the surface.

Upon removing and washing said panel it was found that approximately 100 grams of material was uniformly removed from the surface of the panel together with all surface imperfections.

It is obvious that the method and apparatus of this invention is not limited to the removal of surface imperfections and may be used for grinding and/or polishing for any reason. Therefore, although the present invention has been described with respect to specific detail of certain embodiments thereof, it is not intended that such details be limitations upon the scope of the invention, except insofar as set forth in the following claims.

What is claimed is:

1. In an apparatus for finishing a convex surface of a glass article, a rotatable disc having a cavity surrounded by a rim, said disc having a bored hub whose end projects into said disc cavity, a pad of resilient material substantially filling said cavity, means retaining said pad within such cavity and effecting a fluid seal thereof comprising a backing of flexible impervious material arranged over said pad and secured about its inner edge to said bored hub and about its outer edge to said rim, glass article finishing elements attached to said backing, and means for flowing an abrasive slurry between said backing and the surface of said article, said secured backing having a concave surface curvature of approximately the curvature of such article.

2. In a disc for finishing a convex surface of a glass article, a radially and peripherally flexible concave finishing unit comprising a backing of at least one layer of cloth and at least one layer of rubber-like material, means for rigidly supporting said backing at its central portion and about its periphery, resilient means for cushioning said backing intermediate said central portion and said periphery, glass article finishing elements attached to said backing, and means for flowing an abrasive slurry between said backing and the surface of said article.

3. In a disc for finishing a convex surface of a glass article, a radially and peripherally flexible concave finishing unit comprising a backing of flexible impervious material, means for rigidly supporting said backing at its central portion and about its periphery, resilient means for cushioning said backing intermediate said central portion and said periphery, felt finishing segments attached to said backing, and means for flowing an abrasive slurry between said backing and the surface of said article.

4. In a disc for finishing a convex surface of a glass article, a radially and peripherally flexible concave finishing unit comprising a backing of flexible impervious material, means for rigidly supporting said backing at its central portion and about its periphery, resilient means for cushioning said backing intermediate said central portion and said periphery, peripherally separated curved finishing bars attached to said backing, and means for flowing an abrasive slurry from the center of said backing between said backing and the surface of said article to the periphery thereof.

5. In a disc for finishing a convex surface of a glass article, a radially and peripherally flexible concave finishing unit comprising a backing of at least one layer of cloth and at least one layer of rubber-like material, means for rigidly supporting said backing at its central portion and about its periphery, resilient means for cushioning said backing intermediate said central portion and said periphery, metallic finishing blocks partly embedded in one layer of said rubber-like material, and means for flowing an abrasive slurry from the center of said backing between said backing and the surface of said article to the periphery thereof.

6. In a disc for finishing a convex surface of a glass article, a radially and peripherally flexible concave finishing unit comprising a backing of at least one layer of cloth and at least one layer of substantially water insoluble cement, means for rigidly supporting said backing at its central portion and about its periphery, resilient means for cushioning said backing intermediate said central portion and said periphery, felt finishing segments adhered to said backing by means of said cement, and means for flowing an abrasive slurry between said backing and the surface of said article.

7. An apparatus for finishing a convex surface of a glass article comprising a rotatable disc having a cavity surrounded by a rim, said disc having a bored hub whose end projects into said disc cavity for introducing an abrasive slurry to the article surface, a pad of resilient material substantially filling said cavity, first means for retaining said pad within said cavity and effecting a fluid seal thereof comprising a backing of flexible impervious material arranged over said pad and secured about its inner edge to said bored hub and about its outer edge to said rim, said backing being radially and peripherally flexible in situ, a plurality of glass article finishing elements attached to said backing the outer surfaces thereof forming a concave curvature of approximately the curvature of the such article, and second means for passing said abrasive slurry from said bored hub to the periphery of said disc in contact with said article surface.

8. The apparatus of claim 7 wherein said backing comprises at least one layer of cloth and at least one layer of water insoluble cement.

9. The apparatus of claim 7 wherein said backing comprises at least one layer of cloth and at least one layer of rubber-like material.

10. The apparatus of claim 9 wherein said plurality of glass article finishing elements are rubber-like material segments radially spaced from each other and integrally molded to one layer of said rubber-like material of said backing.

11. An apparatus for finishing a convex surface of a glass article comprising a rotatable disc having a cavity surrounded by a rim, said disc having a bored hub whose end projects into said disc cavity for introducing an abrasive slurry to the article surface, a pad of resilient material substantially filling said cavity, means retaining said pad within such cavity effecting a fluid seal thereof comprising a backing of at least one layer of cloth and at least one layer of rubber-like material secured about its inner edge to said bored hub and about its outer edge to said rim, and at least 10 finishing segments attached to said backing and radially spaced from each other forming separations for passing said slurry from said bored hub to the periphery of said disc in contact with said article surface, said secured backing having a concave surface curvature of approximately the curvature of such article and being radially and peripherally flexible in situ.

References Cited by the Examiner

UNITED STATES PATENTS

| | | | |
|---|---|---|---|
| 1,332,896 | 5/20 | Hoffman | 51—195 |
| 1,508,396 | 9/24 | Johnston | 51—195 |
| 2,001,911 | 5/35 | Woodell et al. | 51—195 X |
| 2,174,902 | 10/39 | Stratford | 51—209 X |
| 2,291,123 | 6/42 | Wallace | 51—195 |
| 2,292,261 | 8/42 | Albertson | 51—195 |
| 2,414,474 | 1/47 | March | 51—195 |
| 2,431,258 | 11/47 | Kirchner | 51—195 |
| 2,479,204 | 8/49 | Buchele | 51—283 |
| 2,707,856 | 5/55 | Kirkman | 51—195 |
| 2,757,491 | 8/56 | Galey | 51—195 |
| 2,787,100 | 4/57 | Peyches | 51—283 |
| 2,804,733 | 9/57 | Hurst | 51—195 X |
| 2,997,816 | 8/61 | Hoget et al. | 51—195 X |
| 3,013,366 | 12/61 | Becker | 51—195 |

LESTER M. SWINGLE, *Primary Examiner.*

FRANK H. BRONAUGH, JOHN C. CHRISTIE,
*Examiners.*